United States Patent
Abraham et al.

(10) Patent No.: US 10,660,042 B2
(45) Date of Patent: May 19, 2020

(54) TECHNIQUES AND APPARATUSES FOR POLLED-MODE POWER SAVING

(71) Applicant: QUALCOMM Incorporated, San Diego, CA (US)

(72) Inventors: Santosh Paul Abraham, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/195,479

(22) Filed: Nov. 19, 2018

(65) Prior Publication Data

US 2019/0159132 A1 May 23, 2019

Related U.S. Application Data

(60) Provisional application No. 62/589,485, filed on Nov. 21, 2017.

(51) Int. Cl.
*H04W 4/00* (2018.01)
*H04W 52/02* (2009.01)
*H04W 24/08* (2009.01)
*H04W 76/28* (2018.01)
*H04W 76/27* (2018.01)
*H04B 7/0413* (2017.01)

(52) U.S. Cl.
CPC ....... *H04W 52/0274* (2013.01); *H04W 24/08* (2013.01); *H04W 52/0235* (2013.01); *H04W 76/27* (2018.02); *H04W 76/28* (2018.02); *H04B 7/0413* (2013.01)

(58) Field of Classification Search
CPC ......... H04W 52/0274; H04W 52/0235; H04W 76/27; H04W 76/28; H04W 24/08; H04B 7/0413
USPC ........................................................ 370/329
See application file for complete search history.

(56) References Cited

U.S. PATENT DOCUMENTS

| 8,127,159 | B1 * | 2/2012 | Chhabra | ............... | G06F 1/3209 |
| | | | | | 713/320 |
| 2016/0135231 | A1 * | 5/2016 | Lee | ....................... | H04W 68/12 |
| | | | | | 370/329 |

OTHER PUBLICATIONS

Media Tek Inc., "Report of Email Discuss [99#43][NB-IoT] RRC Connection Release", Oct. 9-13, 2017. (From Applicant's IDS) (Year: 2017).*
LG, "Quick release of RRC connection for NB-IoT", Oct. 9-13, 2017. (From Applicant's IDS) (Year: 2017).*

(Continued)

*Primary Examiner* — Mang Hang Yeung
(74) *Attorney, Agent, or Firm* — Nerrie M. Zohn

(57) ABSTRACT

A method, a user equipment, a 5G core network device, an apparatus, and a computer program product for wireless communication are provided. Battery life and network efficiency of the user equipment are improved through the usage of a polled-mode power saving technique, wherein the user equipment periodically awakens to poll the 5G core network device regarding whether a communication is available for the user equipment. If the communication is available, the user equipment receives the communication. If the communication is delayed, the user equipment performs discontinuous reception to save power until the communication is available. If the communication is unavailable, the user equipment resumes a sleep mode.

30 Claims, 14 Drawing Sheets

(56) References Cited

OTHER PUBLICATIONS

ASUSTek, "State transition from RRC_Connected to RRC_Inactive", Nov. 1, 2017. (From Applicant's IDS) (Year: 2017).*
Asustek: "State transition from RRC_Connected to RRC_Inactive", 3GPP DRAFT; R2-1717208, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017 Nov. 16, 2017, XP051370915, Retrieved from the Internet: URL:http://www.3gpp.org/ftp/tsg%5Fran/WG2%5FRL2/TSGR2%5F100/Docs/ [retrieved on Nov. 16, 2017], 2 pages.
International Search Report and Written Opinion—PCT/US2018/061992—ISA/EPO—dated Feb. 12, 2019.
LG Electronics Inc: "Quick release of RRC connection for NB-loT", 3GPP Draft; R2-1711346_Quick release of RRC connection for NB-loT, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Oct. 8, 2017, XP051343334, Retrieved from the Internet URL:http://www.3gpp.org/ftp/Meetings_3GPP_SYNC/RAN2/Docs/ [retrieved on Oct. 8, 2017], 5 pages.
Mediatek Inc: "Report of Email Discussion [99#43][NB-loT] RRC Connection Release", 3GPP Draft; R2-1710795, Report of Email Discussion [99#43][NB-loT] RRC Connection Release, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Oct. 8, 2017 (Oct. 8, 2017), XP051342820, Retrieved from the Internet: URL:http://www.3gpp.org/ftp/Meetings_3GPP_SYNC/RAN2/Docs/ [retrieved on Oct. 8, 2017], 15 pages.

* cited by examiner

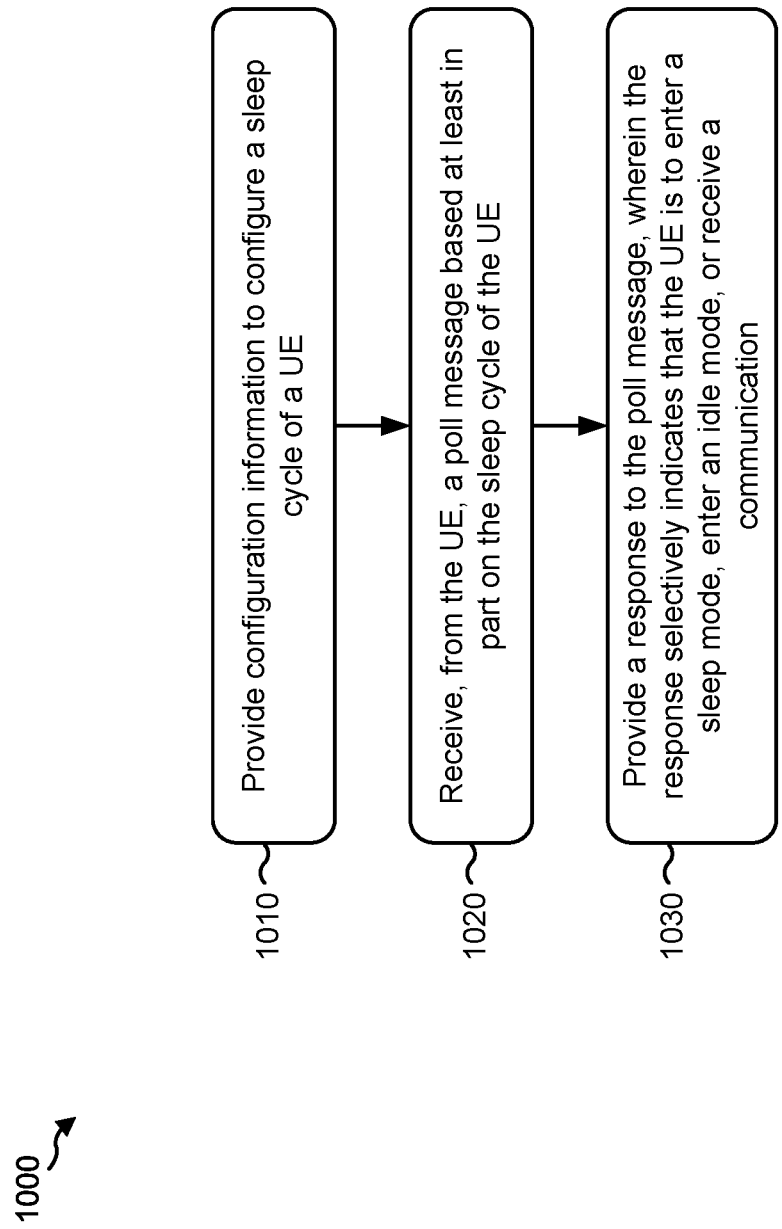

TECHNIQUES AND APPARATUSES FOR POLLED-MODE POWER SAVING

CROSS-REFERENCE TO RELATED APPLICATIONS UNDER 35 U.S.C. § 119

This application claims priority to U.S. Provisional Patent Application No. 62/589,485, filed on Nov. 21, 2017, entitled "TECHNIQUES AND APPARATUSES FOR POLLED-MODE POWER SAVING FOR CELLULAR TOT," which is hereby expressly incorporated by reference herein.

BACKGROUND

Field

Aspects of the present disclosure generally relate to wireless communication, and more particularly to techniques and apparatuses for polled-mode power saving (e.g., for cellular Internet of Things (C-IoT)).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A UE may use power saving techniques to conserve power and extend battery life of the UE. This may be particularly useful for IoT UEs, such as C-IoT UEs. For example, some IoT UEs may communicate infrequently, so it may be beneficial for such IoT UEs to periodically enter a deep sleep mode, according to a deep sleep cycle, to conserve battery power. Examples of deep sleep cycles include a Power Saving Mode (PSM) cycle and idle mode extended discontinuous reception (I-eDRX). In a PSM cycle, a UE may enter an active mode after performing a tracking area update (TAU) until an activity timer expires, then may enter a deep sleep mode until the next TAU. In I-eDRX, a UE may periodically awaken from a deep sleep mode to monitor for paging.

SUMMARY

Some UEs may communicate infrequently (e.g., once per hour, once every several hours, once every several days, only once a condition is satisfied, etc.), and/or may communicate irregularly. In such a case, PSM and eDRX cycles may use unnecessary power by causing a UE to wake up and monitor paging occasions more frequently than is needed. Furthermore, it may be beneficial to provide flexibility in deep sleep cycle configuration so that a deep sleep cycle can be more efficiently configured for particular applications (e.g., C-IoT applications or other applications), thereby further improving UE battery life and improving network efficiency.

Techniques and apparatuses described herein may provide a configurable deep sleep cycle which may be termed a polled-mode power saving cycle. In the polled-mode power saving cycle, a UE may configure or request a deep sleep cycle from the 5G core network. The UE may awaken according to the deep sleep cycle, and may poll the 5G core network to determine if a communication is to be received. In some aspects, the polling may be event-driven (e.g., caused by or associated with an event at the UE). For example, the polling may be aperiodic in some aspects. In some aspects, the polling may be driven or configured by an application at the UE, rather than a network. For example, the application may cause the event, may configure the deep sleep cycle, may cause the poll to be performed, and/or the like. When the UE determines that the communication is to be received, the UE may receive the communication and/or enter an idle mode (e.g., an idle mode discontinuous reception (DRX) cycle, or the like) or a connection-suspended mode (e.g., a connected mode DRX cycle, or the like) to await the communication. In this way, polled-mode power saving may improve battery life, reduce UE power consumption, and improve network efficiency.

In an aspect of the disclosure, a method, a user equipment, an apparatus, a 5G core network device, a non-transitory computer-readable medium, and a computer program product are provided.

In some aspects, the method may be performed by a UE. The method may include transmitting a poll message after awakening from a sleep mode; receiving a response to the poll message, the response indicating whether or not a communication is available for the UE; and entering an idle mode or a connection-suspended mode if the response to the poll message indicates that the communication is available for the UE and provision of the communication is delayed.

In some aspects, the UE may include a memory and at least one processor coupled to the memory. The memory and the at least one processor may be configured to transmit a poll message after awakening from a sleep mode; receive a response to the poll message, the response indicating whether or not a communication is available for the UE; and enter an idle mode or a connection-suspended mode if the response to the poll message indicates that the communication is available for the UE and provision of the communication is delayed.

In some aspects, the apparatus may include means for transmitting a poll message after awakening from a sleep mode; means for receiving a response to the poll message, the response indicating whether or not a communication is available for the apparatus; and entering an idle mode or a connection-suspended mode if the response to the poll message indicates that the communication is available for the apparatus and provision of the communication is delayed.

In some aspects, the non-transitory computer-readable medium may store one or more instructions for wireless communication. The one or more instructions may include one or more instructions that, when executed by one or more processors of a UE, cause the one or more processors to transmit a poll message after awakening from a sleep mode; receive a response to the poll message, the response indicating whether or not a communication is available for the UE; and enter an idle mode or a connection-suspended mode if the response to the poll message indicates that the communication is available for the UE and provision of the communication is delayed.

In some aspects, the method may be performed by a 5G core network device. The method may include providing configuration information to configure a sleep cycle of a user equipment (UE), wherein the configuration information is for an idle mode or a connection-suspended mode of the UE, the idle mode and the connection-suspended mode each comprising a mode for the UE to enter if communication is available for the UE and provision of the communication is delayed; receiving, from the UE, a poll message; and transmitting a response to the poll message, the response indicating whether or not a communication is available for the UE.

In some aspects, the 5G core network device may include a memory and at least one processor coupled to the memory. The memory and the at least one processor may be configured to provide configuration information to configure a sleep cycle of a user equipment (UE), wherein the configuration information is for an idle mode or a connection-suspended mode of the UE, the idle mode and the connection-suspended mode each comprising a mode for the UE to enter if communication is available for the UE and provision of the communication is delayed; receive, from the UE, a poll message; and transmit a response to the poll message, the response indicating whether or not a communication is available for the UE.

In some aspects, the apparatus may include means for providing configuration information to configure a sleep cycle of a user equipment (UE), wherein the configuration information is for an idle mode or a connection-suspended mode of the UE, the idle mode and the connection-suspended mode each comprising a mode for the UE to enter if communication is available for the UE and provision of the communication is delayed; means for receiving, from the UE, a poll message; and means for transmitting a response to the poll message, the response indicating whether or not a communication is available for the UE.

In some aspects, the non-transitory computer-readable medium may store one or more instructions for wireless communication. The one or more instructions may include one or more instructions that, when executed by one or more processors of a UE, cause the one or more processors to provide configuration information to configure a sleep cycle of a user equipment (UE), wherein the configuration information is for an idle mode or a connection-suspended mode of the UE, the idle mode and the connection-suspended mode each comprising a mode for the UE to enter if communication is available for the UE and provision of the communication is delayed; receive, from the UE, a poll message; and transmit a response to the poll message, the response indicating whether or not a communication is available for the UE.

Aspects generally include a method, apparatus, system, computer program product, non-transitory computer-readable medium, user equipment, 5G core network device, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 10A and 10B are flow charts of methods of wireless communication.

DETAILED DESCRIPTION

Figure 1:
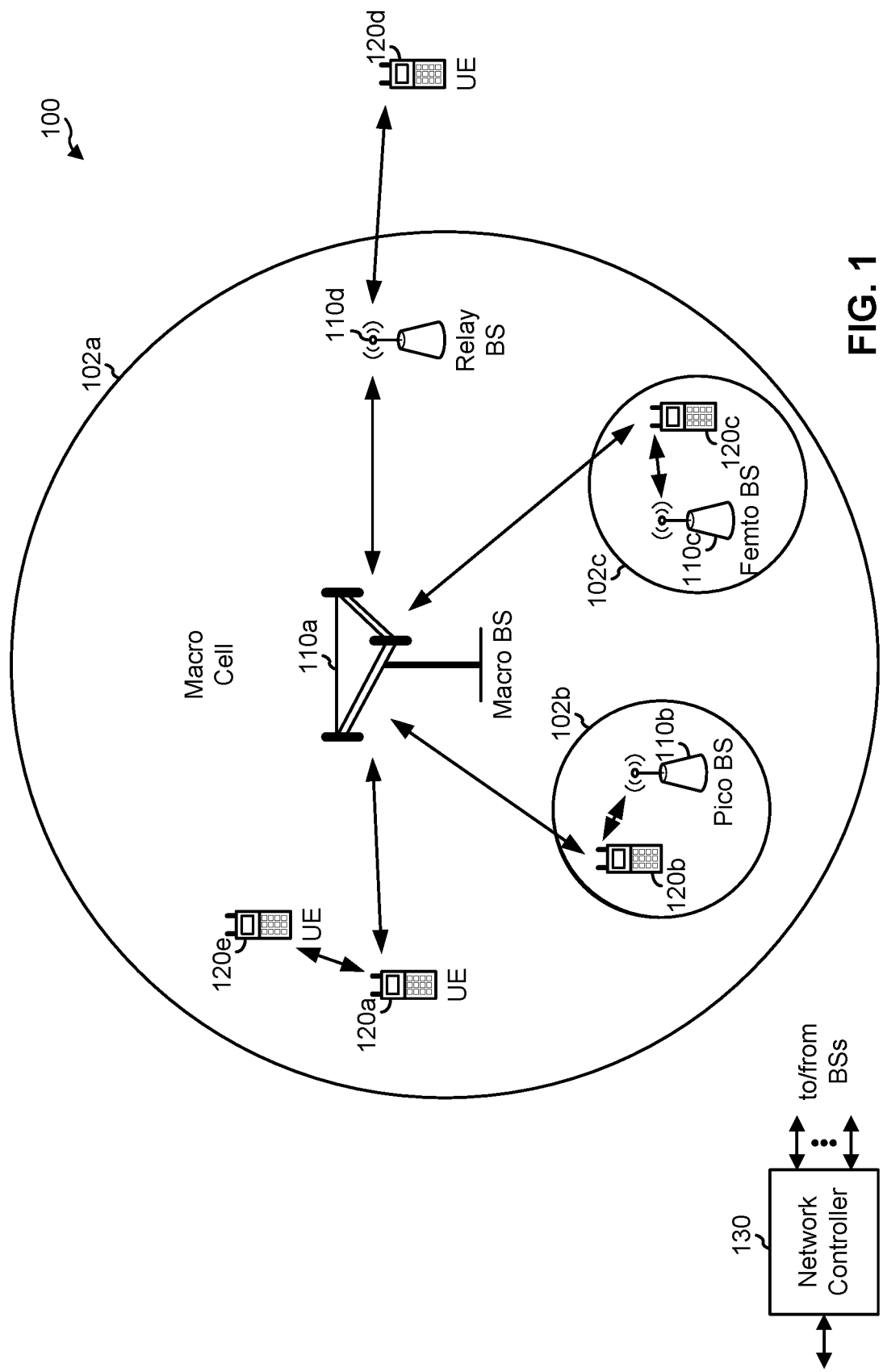
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, the network controller 130 may include, for example, a 5G core network device, an access node controller, and/or the like. In some aspects, one or more of the functions of network controller 130 may be performed by one or more BSs. Additionally, or alternatively, BS 110 may include a 5G core network device, an access node controller, and/or the like.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
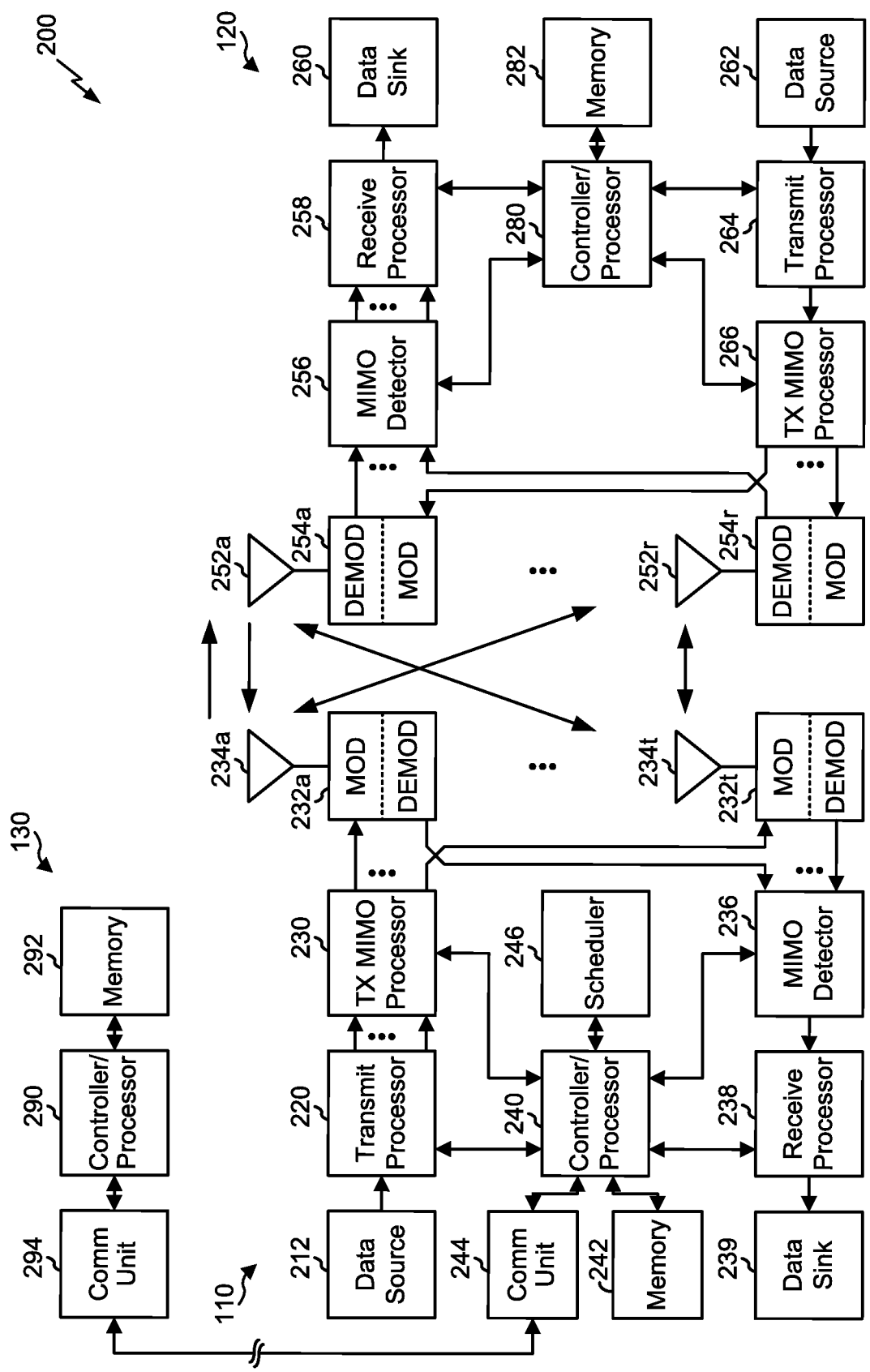
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234 (shown as antennas 234*a* through 234*t*), and UE 120 may be equipped with R antennas 252 (shown as antennas 252*a* through 252*r*), where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232 (illustrated as MODs 232a through 232t). Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254 (illustrated as DEMODs 254a through 254r), respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform one or more techniques associated with a polled mode power saving cycle for IoT UEs, as described in more detail elsewhere herein. For example, controller/processor 280 of UE 120, MOD/DEMOD 254 of UE 120, receive processor 258 of UE 120, and/or any other component(s) of FIG. 2 may perform or direct operations of, for example, methods 700/735 of FIGS. 7A and 7B. For example, controller/processor 240 of BS 110, MOD/DEMOD 232 of BS 110, transmit processor 220 of BS 110, receive processor 238 of BS 110, and/or the like, may perform method 1100 of FIG. 11, and/or other processes as described herein. Some of the operations described herein may be performed by network controller 130, as described in more detail elsewhere herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
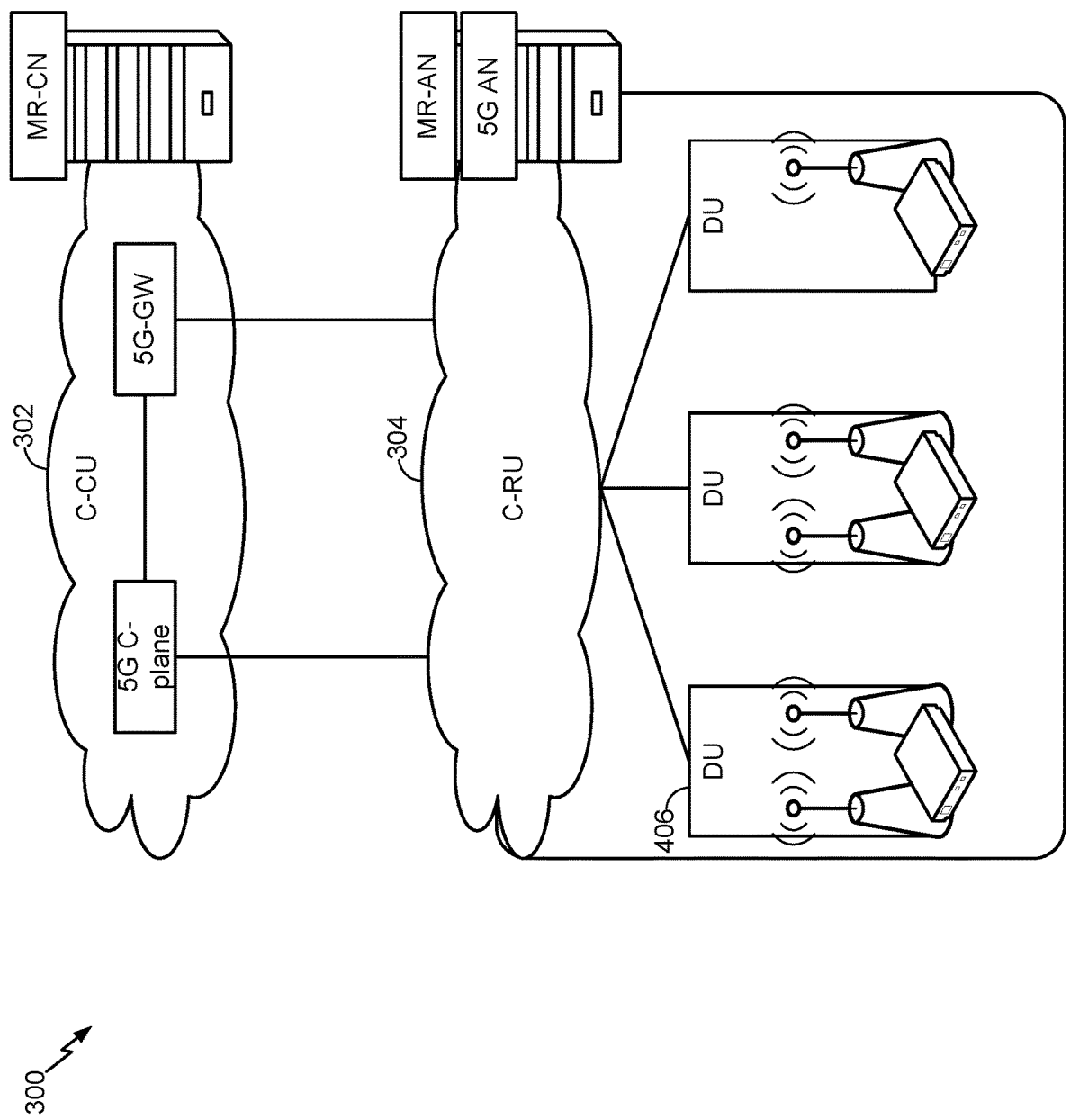
FIG. 3 is a diagram illustrating an example physical architecture of a distributed RAN.

FIG. 3 illustrates an example physical architecture of a distributed radio access network (RAN) 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host core network functions locally. The C-RU may have distributed deployment. The C-RU may be closer to the network edge. In some aspects, the C-RU may receive a poll message from a UE (e.g., UE 120), and may forward (e.g., relay, provide) the poll message to the C-CU. The C-CU may provide an indication of whether or not traffic is to be provided to the UE and/or whether the UE can enter a sleep mode.

A distributed unit (DU) 306 may host one or more TRPs. The DU may be located at edges of the network with radio frequency (RF) functionality.

In some aspects, one or more devices of FIG. 3 (e.g., C-CU 302, C-RU 304, etc.) may include or be referred to as a 5G core network device, a network controller (e.g., network controller 130), and/or the like.

As indicated above, FIG. 3 is provided merely as an example. Other examples are possible and may differ from what was described with regard to FIG. 3.

Figure 4:
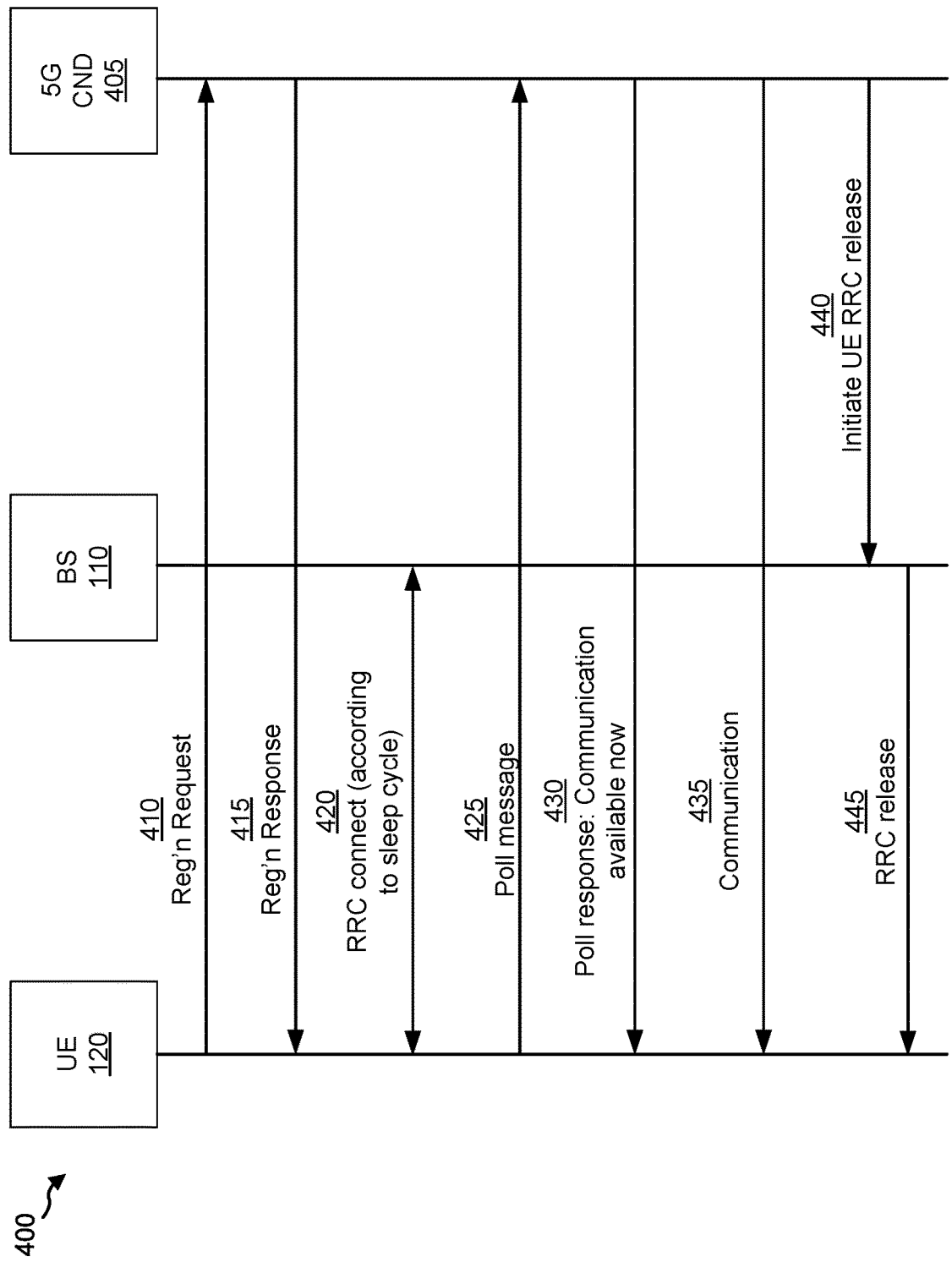
FIG. 4 is a diagram illustrating an example of a call flow for configuring and performing a polled mode power save cycle.

FIG. 4 is a diagram illustrating an example 400 of a call flow for configuring and performing a polled mode power save cycle. As shown, FIG. 4 includes a UE 120, a BS 110, and a 5G core network device (CND) 405. 5G CND 405 may include a network controller (e.g., network controller 130), a CU, and/or the like.

As shown in FIG. 4, and by reference number 410, UE 120 may transmit a registration request to 5G CND 405. In some aspects, the registration request may be referred to herein as a request. The registration request may request configuration of a polled mode power saving cycle or sleep cycle by the 5G CND 405. In some aspects, the registration request may identify one or more parameters of the polled mode power saving cycle or sleep cycle. For example, the registration request may identify a cycle length that is requested for the polled mode power saving cycle or sleep cycle. Additionally, or alternatively, the registration request may identify a length of an idle mode or a connection-suspended mode, such as a requested length of time for an idle mode or a connection-suspended mode. For example, when UE 120 receives an indication that a communication is available but delayed, UE 120 may enter the idle mode or the connection-suspended mode for a particular length of time. In some aspects, the particular length of time may be the requested length of time. In some aspects, the particular length of time may be another length of time, as described in more detail elsewhere herein.

As shown by reference number 415, UE 120 may receive a registration response from 5G CND 405. In some aspects, the registration response may be termed a registration accept or a response. In some aspects, the registration response may indicate that the polled mode power saving cycle or sleep cycle is configured. In some aspects, the registration response may identify one or more parameters for the polled mode power saving cycle or sleep cycle. For example, the registration response may identify a cycle length and/or a length of an idle mode or a connection-suspended mode, which may be the same as the requested cycle length or the requested length of the idle mode or the connection-suspended mode, or may be different than the requested cycle length or the requested length of the idle mode or the connection-suspended mode.

As shown by reference number 420, UE 120 may establish a radio resource control (RRC) connection with BS 110 based at least in part on the sleep cycle. For example, UE 120 may establish the RRC connection to transmit the poll message to 5G CND 405. In some aspects, UE 120 may exit a deep sleep state (not shown) to establish the RRC connection. Thus, the BS 110 may consider the UE 120 to be in an RRC connected mode.

As shown by reference number 425, UE 120 may transmit a poll message to 5G CND 405. In some aspects, the poll message may include a non-access stratum (NAS) message, and/or the like. UE 120 may transmit the poll message to determine whether a communication (e.g., a mobile-terminated communication) is to be provided to UE 120. For example, 5G CND 405 may buffer the communication until the communication is to be provided to UE 120. 5G CND 405 may transmit a poll response upon receipt of the poll message to indicate that the communication is ready for transmission to UE 120.

In some aspects, the UE 120 may transmit the poll message based at least in part on an application at the UE 120. For example, the UE 120 may transmit the poll message based at least in part on an indication or event associated with the application. In some aspects, the UE 120 may transmit the poll message based at least in part on a determination that a condition is satisfied with regard to the application. For example, if the application is a temperature sensing application, the UE 120 may transmit a poll message (e.g., based at least in part on an indication or event from the application) when a temperature-related threshold is satisfied. In other words, in some aspects, the transmission of the poll message may be caused by or configured by an application at the UE 120, rather than by a network (e.g., BS 110, etc.).

In some aspects, the UE 120 may transmit the poll message in connection with an event. For example, the UE 120 may transmit the poll message based at least in part on an event-based trigger. The event-based trigger may be associated with any event that can be sensed by the UE 120, such as a low battery event, a mobility event, a temperature event, a pressure event, or another type of event.

In some aspects, the poll message may be periodic (e.g., may be transmitted with a regular periodicity). In some aspects, the poll message may be aperiodic. For example, the poll message may be transmitted non-periodically based at least in part on an event, an application, and/or the like.

Figure 5:
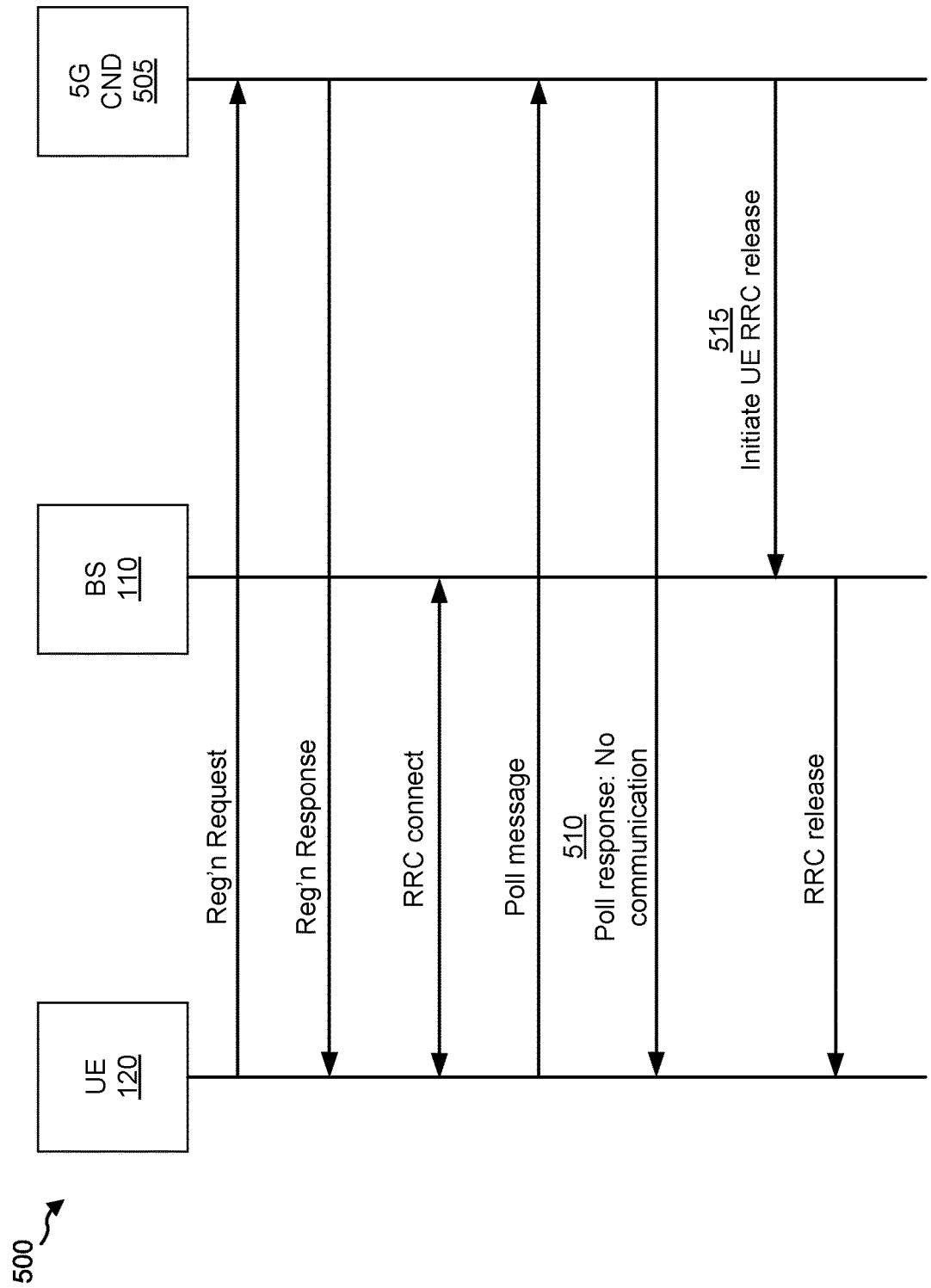
FIG. 5 is a diagram illustrating an example of a call flow for configuring and performing a polled mode power save cycle.
Figure 6:
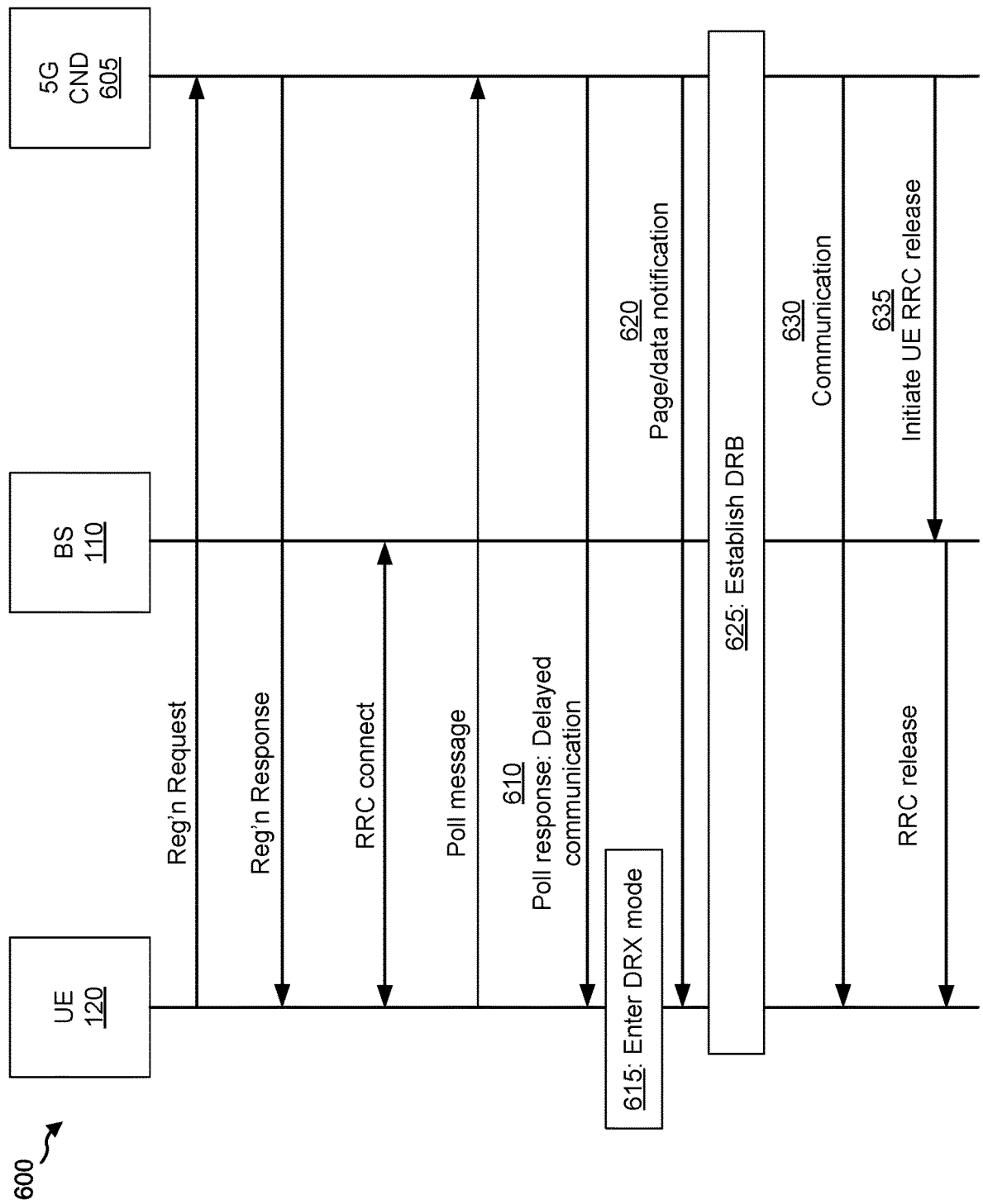
FIG. 6 is a diagram illustrating an example of a call flow for configuring and performing a polled mode power save cycle.

As shown by reference number 430, UE 120 may receive a poll response from 5G CND 405. For example, 5G CND 405 may provide the poll response based at least in part on receiving the poll message from UE 120. In some aspects, the poll response may be a NAS message or a NAS communication. As shown, in some aspects, the poll response may indicate that a communication is ready for transmission to UE 120. For example, the poll response may include information indicating that the communication is ready for transmission to UE 120. In some aspects, the poll response may indicate that no communication is available for UE 120 (as shown in FIG. 5), or that a communication is available and delayed (as shown in FIG. 6).

As shown by reference number 435, 5G CND 405 may provide the communication to UE 120. For example, 5G CND 405 may provide the communication via the RRC connection. In some aspects, another device may provide the communication. For example, UE 120 may receive the communication from any device other than 5G CND 405. In some aspects, UE 120 may initiate establishment of a bearer (e.g., a dedicated radio bearer) (not shown) to receive the communication.

As shown by reference number 440, after providing the communication to UE 120 (or after the communication is provided to UE 120), 5G CND 405 may initiate release of the RRC connection of UE 120. For example, 5G CND 405 may provide an instruction (e.g., release assistance information) to BS 110 to release the RRC connection of UE 120. By causing the RRC connection to be released after the communication is received, battery power of UE 120 and network resources are conserved.

As shown by reference number 445, UE 120 and BS 110 release the RRC connection.

In some aspects, UE 120 may enter a deep sleep mode after the RRC connection is released. For example, UE 120 may enter the deep sleep mode until a next sleep cycle has elapsed, may establish an RRC connection, and may transmit another poll message. In this way, UE 120 performs a polled-mode power saving cycle, which conserves battery resources of the UE 120 as well as network resources.

If UE 120 is to transmit an uplink communication, UE 120 may awake from the sleep mode, establish an RRC connection and a dedicated radio bearer (DRB), and may transmit the communication. In other words, UE 120 may not need to poll the 5G CND 405 to perform an uplink communication.

As indicated above, FIG. 4 is provided as an example. Other examples are possible and may differ from what was described with respect to FIG. 4.

FIG. 5 is a diagram illustrating an example 500 of another call flow for configuring and performing a polled mode power save cycle. As shown, FIG. 5 includes a UE 120, a BS 110, and a 5G CND 505 (e.g., 5G CND 405). FIG. 5 is an example wherein 5G CND 505 determines that no communication is to be provided to UE 120.

As shown in FIG. 5, UE 120 and 5G CND 505 may exchange a registration request, a registration response, and a poll message, which are described in more detail in connection with FIG. 5, above.

As shown by reference number 510, 5G CND 505 may provide a poll response indicating that no communication (e.g., no mobile-terminated communication) is to be provided to UE 120. For example, 5G CND 505 may determine that no communication is scheduled for UE 120, no communication is buffered for UE 120, and/or the like. Thus, by providing the poll request and receiving the poll response, UE 120 may determine whether a communication is to be provided to UE 120 without monitoring a paging channel and/or entering an idle mode or a connection-suspended mode, which conserves battery power and network resources.

As shown by reference number 515, after providing the poll response, 5G CND 505 may initiate an RRC release for UE 120, as described in more detail in connection with FIG. 5, above. As further shown, UE 120 and BS 110 may release the RRC connection. Thus, UE 120 returns to the sleep mode after the polling occasion, further conserving battery power of UE 120.

As indicated above, FIG. 5 is provided as an example. Other examples are possible and may differ from what was described with respect to FIG. 5.

FIG. 6 is a diagram illustrating an example 600 of yet another call flow for configuring and performing a polled mode power save cycle. As shown, FIG. 6 includes a UE 120, a BS 110, and a 5G CND 605 (e.g., 5G CND 405, 5G CND 505). FIG. 6 is an example wherein 5G CND 605 determines that a communication is to be provided to UE 120 and the communication is delayed.

As shown in FIG. 6, UE 120 and 5G CND 605 may exchange a registration request, a registration response, and a poll message, which are described in more detail in connection with FIG. 5, above.

As shown by reference number 610, 5G CND 605 may transmit a poll response to UE 120. The poll response may indicate that a communication (e.g., a mobile-terminated communication) is to be provided to UE 120, and that the communication is delayed. For example, the communication may be delayed based at least in part on a buffering process, a delay between an originating device and UE 120, and/or the like. The poll response may indicate to UE 120 that UE 120 should not enter a deep sleep until the communication is received.

As shown by reference number 615, UE 120 may enter a DRX mode until the communication is received. In some aspects, the DRX mode may be referred to as an idle mode or a connection-suspended mode. For example, the idle mode or the connection-suspended mode may include one or more DRX periods. In some aspects, the DRX mode may be a connected-mode DRX (referred to herein as the connection-suspended mode), which may reduce latency of the communication. In some aspects, the DRX mode may be an idle-mode DRX (referred to herein as an idle mode), which may conserve power in comparison to the connected-mode DRX. In this way, UE 120 may conserve battery power and network resources in relation to entering the deep sleep mode, then re-establishing the RRC connection when the communication is ready to be received.

As shown by reference number 620, UE 120 may receive a data notification or page indicating that the communication is ready for UE 120. For example, when UE 120 uses connected-mode DRX, UE 120 may receive a data notification indicating that the communication is ready. When UE 120 uses idle-mode DRX, UE 120 may receive a page indicating that the communication is ready.

As shown by reference number 625, UE 120 may establish a DRB based at least in part on receiving the data notification or page. For example, UE 120 may establish the DRB to receive the communication, as described in more detail elsewhere herein.

As shown by reference number 630, UE 120 may receive the communication. For example, 5G CND 605 may transmit the communication to UE 120 via the RRC connection. As shown by reference number 635, and as described in more detail in connection with FIG. 5, above, 5G CND 605 may cause the RRC connection to be torn down. In this way, UE 120 may enter a deep sleep mode associated with a sleep cycle after the delayed communication is received, which improves battery life and network efficiency.

As indicated above, FIG. 6 is provided as an example. Other examples are possible and may differ from what was described with respect to FIG. 6.

Figure 7A:
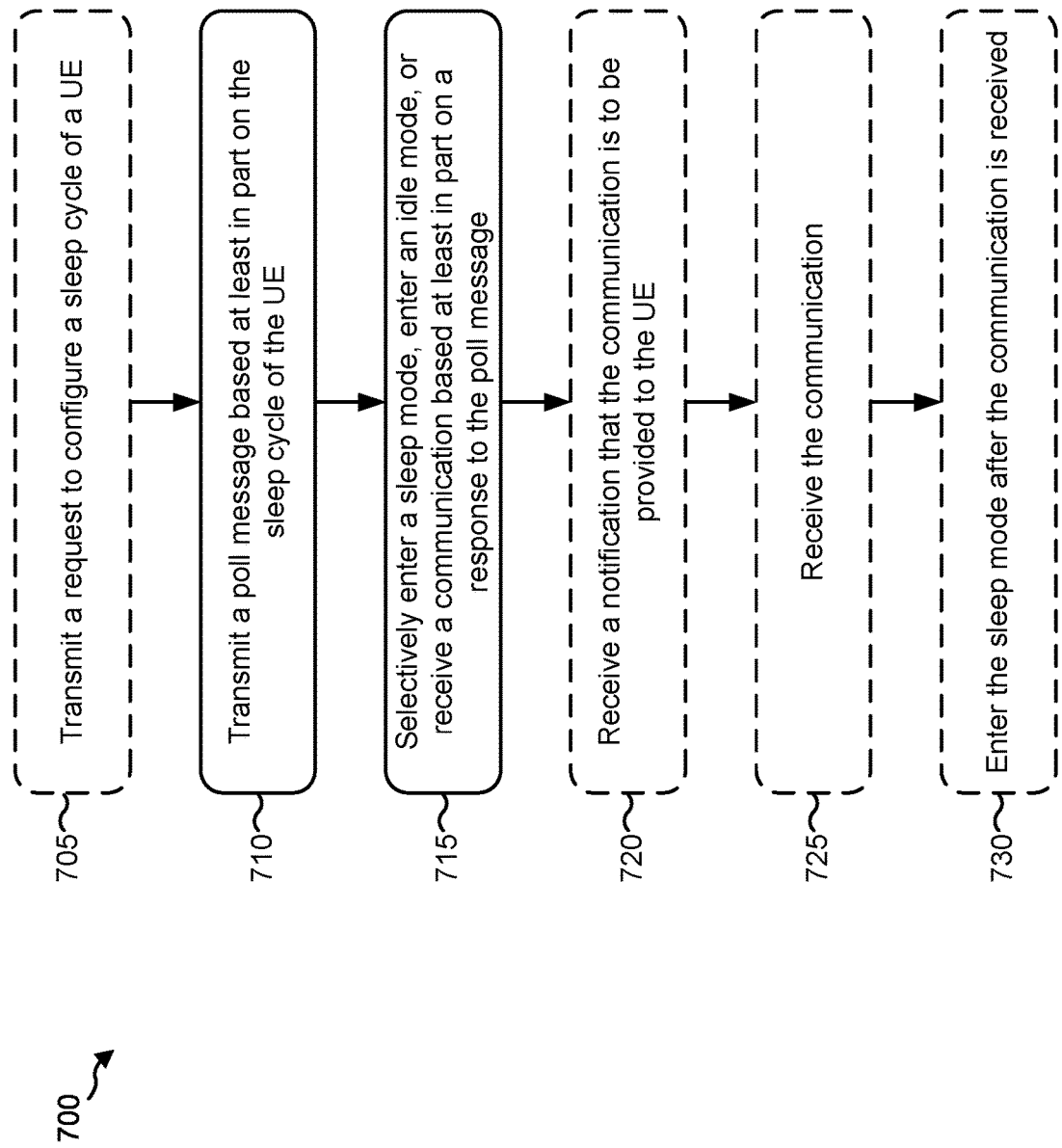
FIGS. 7A and 7B are flow charts of methods of wireless communication.
Figure 7B:
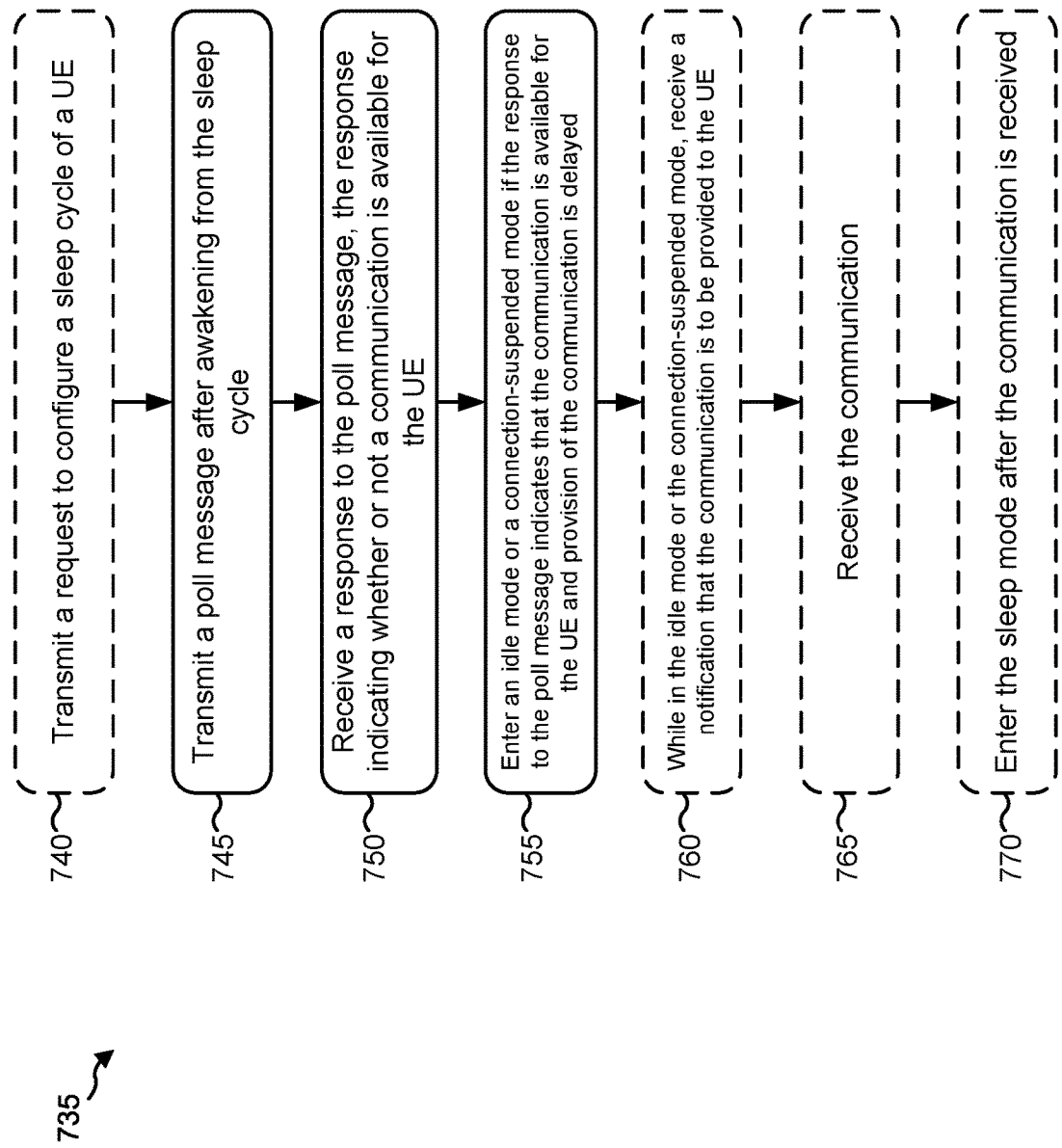

FIGS. 7A and 7B are flow charts of methods 700/735 of wireless communication. The methods may be performed by a UE (e.g., the UE 120 of FIG. 1, the apparatus 802/802', and/or the like).

At 705, the UE (e.g., using controller/processor 280, transmit processor 264, TX MIMO processor 266, MOD 254, antenna 252, and/or the like) may optionally transmit a request to configure a sleep cycle of the UE. For example, the request may include a registration request (e.g., registration request 410), as described in more detail, for example, in connection with FIG. 5. In some aspects, the UE may negotiate a sleep cycle of the UE at this stage. For example, the UE and a 5G CND may negotiate a length of the sleep cycle, a length of an idle mode or a connection-suspended mode (e.g., DRX mode and/or the like), or another parameter associated with the sleep cycle. In some aspects, the length of the idle mode or the connection-suspended mode is negotiated at a registration stage.

At 710, the UE (e.g., using controller/processor 280, transmit processor 264, TX MIMO processor 266, MOD 254, antenna 252, and/or the like) may transmit a poll message based at least in part on the sleep cycle of the UE. For example, the UE may awaken from a sleep mode of the sleep cycle, and may transmit a poll message. The UE may transmit the poll message to determine whether any communication is ready for the UE. In some aspects, the UE is configured to transmit the poll message and receive the response over a radio resource control (RRC) connection, and wherein the RRC connection is ended when the UE enters the sleep mode. In some aspects, the UE is configured to transmit the poll message and receive the response over a radio resource control (RRC) connection, and the RRC connection remains established while the UE is in the connection-suspended mode. In some aspects, the poll message is transmitted based at least in part on an application at the UE. In some aspects, the poll message is transmitted based at least in part on the UE detecting an event.

At 715, the UE (e.g., using antenna 252, DEMOD 254, MIMO detector 256, receive processor 258, controller/processor 280, and/or the like) may selectively enter a sleep mode, enter an idle mode, or receive a communication based at least in part on a response to the poll message. For example, the UE may receive a response, which may be the poll response described in connection with FIGS. 4-6, above. In some aspects, the UE is configured to enter the idle mode when the response indicates that the communication is available for the UE and provision of the communication is delayed. In some aspects, the idle mode includes one or more discontinuous reception mode periods. In some aspects, the response indicates the length of the idle mode. In some aspects, the UE is configured to enter the sleep mode when the response indicates that no communication is available for the UE. In some aspects, the poll message may include a non-access stratum (NAS) message. In some aspects, the poll message may include a modified service request message. In some aspects, the response may include a NAS message. In some aspects, the response may include a modified service response message. In some aspects, the UE may enter a connection-suspended mode based at least in part on the response to the poll message.

At 720, the UE (e.g., using antenna 252, DEMOD 254, MIMO detector 256, receive processor 258, controller/processor 280, and/or the like) may receive a notification that the communication is to be provided to the UE. For example, when the UE has entered idle mode (e.g., DRX) based at least in part on a response indicating that the communication is available and delayed, the UE may receive a notification. The notification may include a data notification or a page, based at least in part on whether the UE is in a connected-mode DRX or an idle-mode DRX.

At 725, the UE (e.g., using antenna 252, DEMOD 254, MIMO detector 256, receive processor 258, controller/processor 280, and/or the like) may receive the communication. For example, the UE may receive the communication based at least in part on the notification. In some aspects, the UE may request or establish a DRB to receive the communication.

At 730, the UE (e.g., using antenna 252, DEMOD 254, MIMO detector 256, receive processor 258, controller/processor 280, and/or the like) may enter the sleep mode after the communication is received. For example, after the communication is receive, the 5G CND may cause the RRC connection to be released, and the UE may enter the sleep mode. In this way, the UE receives a delayed communication and returns to a sleep mode until a next iteration of the polling procedure.

Turning now to process 735 of FIG. 7B, at 740, the UE (e.g., using controller/processor 280, transmit processor 264, TX MIMO processor 266, MOD 254, antenna 252, and/or the like) may optionally transmit a request to configure a sleep cycle of the UE, as described in more detail in connection with block 705 of process 700. At 745, the UE (e.g., using controller/processor 280, transmit processor 264, TX MIMO processor 266, MOD 254, antenna 252, and/or the like) may transmit a poll message after awakening from the sleep cycle, as described in more detail in connection with block 710 of process 700. At 750, the UE (e.g., using antenna 252, DEMOD 254, MIMO detector 256, receive processor 258, controller/processor 280, and/or the like) may receive a response to the poll message, the response indicating whether or not a communication is available for the UE. For example, the response may be the poll response described in connection with FIGS. 4-6, above.

At 755, the UE (e.g., using antenna 252, DEMOD 254, MIMO detector 256, receive processor 258, controller/processor 280, and/or the like) may enter an idle mode or a connection-suspended mode if the response to the poll message indicates that the communication is available for the UE and provision of the communication is delayed, as described in more detail in connection with FIGS. 4-6, above. The idle mode may include, for example, an idle mode (e.g., wherein the UE is tracked using paging), an idle-mode DRX (I-DRX) cycle, and/or the like. The connection-suspended mode may include a suspended connected mode (e.g., where no active communication is taking place, but connection information from an established RRC connection such as encryption keys is stored to allow for quick resumption of communication using, for example, the established RRC connection), a connected-mode DRX (C-DRX) cycle, and/or the like. When the response to the poll message indicates that a communication is ready for the UE, then the UE may receive the communication (e.g., in an RRC connected mode (where an established RRC connection is actively being used for communication), an active mode, etc.). When the response to the poll message indicates that no communication is available for the UE, then the UE may enter a deep sleep state until a next awakening to poll the network.

At 760, while in the idle mode or the connection-suspended mode, the UE (e.g., using antenna 252, DEMOD 254, MIMO detector 256, receive processor 258, controller/processor 280, and/or the like) may optionally receive a notification that the communication is to be provided to the UE. For example, the notification may include a traffic notification (e.g., when the UE is in an active mode, an RRC connected mode, or a connection-suspended mode), a page (e.g., when the UE is in an idle mode), and/or the like.

At 765, the UE (e.g., using antenna 252, DEMOD 254, MIMO detector 256, receive processor 258, controller/processor 280, and/or the like) may optionally receive the communication, as described in more detail in connection with block 725, above. At 770, the UE (e.g., using antenna 252, DEMOD 254, MIMO detector 256, receive processor 258, controller/processor 280, and/or the like) may optionally enter the sleep mode after the communication is received, as described in more detail in connection with block 730, above.

Although FIGS. 7A and 7B show example blocks of methods of wireless communication, in some aspects, the methods may include additional blocks, fewer blocks, different blocks, or differently arranged blocks than those shown in FIGS. 7A and 7B. Additionally, or alternatively, two or more blocks shown in FIGS. 7A and 7B may be performed in parallel.

Figure 8:
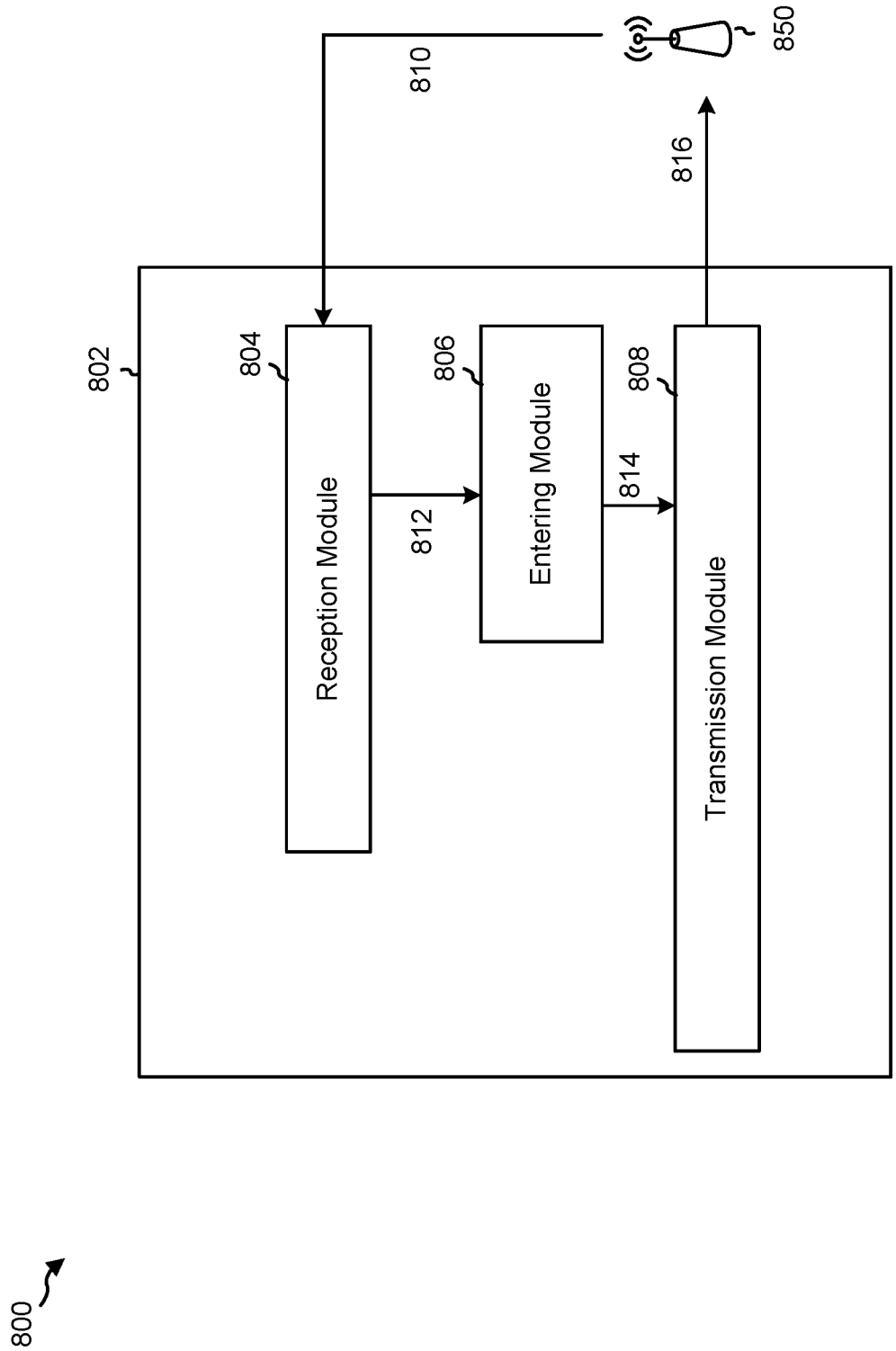
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE. In some aspects, the apparatus 802 includes a reception module 804, an entering module 806, and/or a transmission module 808.

Reception module 804 may receive data 810 from BS 850 (e.g., BS 110 and/or a 5G CND) (e.g., using antenna 252, DEMOD 254, MIMO detector 256, receive processor 258, controller/processor 280, and/or the like). The data 810 may include, for example, a registration response, a poll response, a data notification or page relating to a communication, a communication, and/or other data. Reception module 804 may provide data 812 to entering module 806.

Entering module 806 may cause the apparatus 802 to enter an idle mode, a connection-suspended mode or a sleep mode based at least in part on the data 812 (e.g., using antenna 252, DEMOD 254, MIMO detector 256, receive processor 258, controller/processor 280, and/or the like). Entering module 806 may provide data 814 to transmission module 808. Additionally, or alternatively, reception module 804 or another module of the apparatus 802 (not shown) may provide data to transmission module 808.

Transmission module 808 may transmit data 816 to BS 850 (e.g., using controller/processor 280, transmit processor 264, TX MIMO processor 266, MOD 254, antenna 252, and/or the like). The data 816 may include, for example, a registration request, a poll message, and/or the like.

The apparatus may include additional modules that perform each of the blocks of the algorithm in the aforementioned methods 700/735 of FIGS. 7A and 7B and/or the like. As such, each block in the aforementioned methods 700/735 of FIGS. 7A and 7B, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example.

In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules)

shown in FIG. 8 may perform one or more functions described as being performed by another set of modules shown in FIG. 8.

Figure 9:
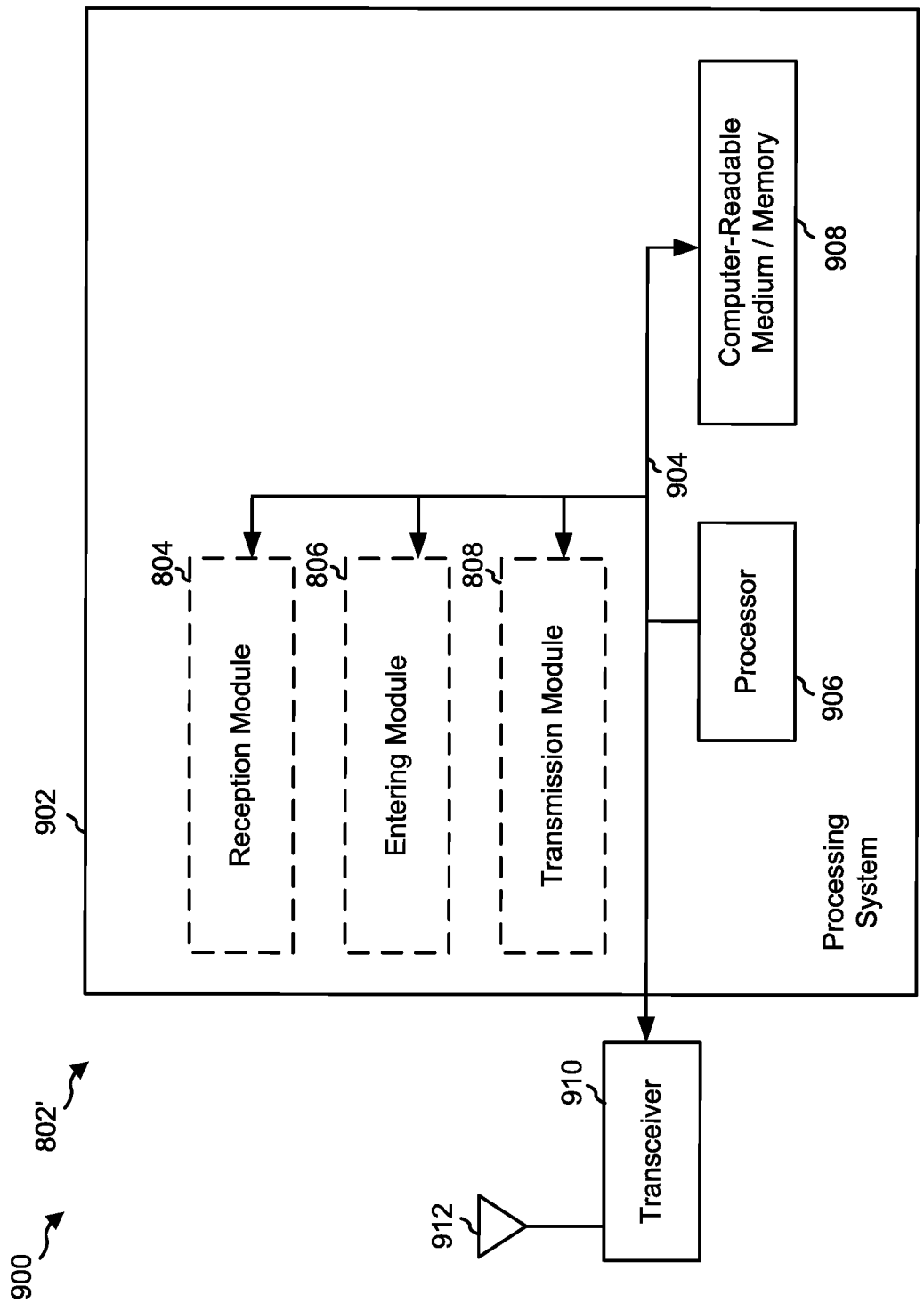
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, and 808. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the RX processor 258, and/or the controller/processor 280.

In some aspects, the apparatus 802/802' for wireless communication includes means for transmitting a request to configure a sleep cycle; means for transmitting a poll message based at least in part on the sleep cycle; means for selectively entering a sleep mode, entering an idle mode, or receiving a communication; means for receiving a notification that the communication is to be provided to the apparatus 802/802; means for receiving the communication; means for entering the sleep mode after the communication is received; means for transmitting a poll message after awakening from a sleep mode; means for receiving a response to the poll message, the response indicating whether or not a communication is available for the apparatus 802/802'; means for entering an idle mode or a connection-suspended mode if the response to the poll message indicates that the communication is available for the apparatus 802/802' and provision of the communication is delayed; and means for transmitting a request to configure a sleep cycle of the apparatus 802/802', wherein the request indicates a length of the idle mode or the connection-suspended mode. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 266, the RX processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 9 is provided as an example. Other examples are possible and may differ from what was described in connection with FIG. 9.

Figure 10B:
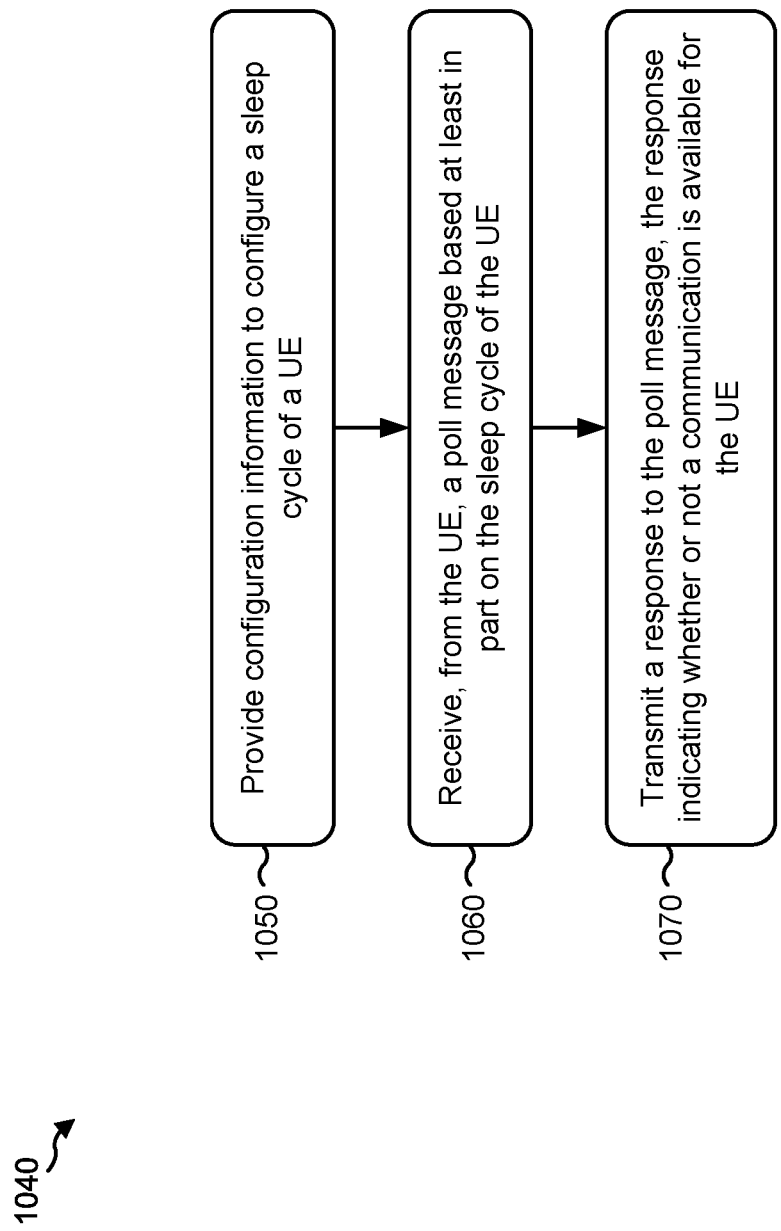

FIGS. 10A and 10B are flow charts of methods 1000/1040 of wireless communication. The methods may be performed by a 5G CND (e.g., the network controller 130 of FIG. 1, the the 5G CND 405/505/605, the apparatus 1102/1102', and/or the like).

At 1010, the 5G CND (e.g., using controller/processor 290, memory 292, communication unit 294, and/or the like) may provide configuration information to configure a sleep cycle of a UE. For example, the 5G CND may provide a registration response (e.g., registration response 415). In some aspects, the 5G CND may provide the registration response based at least in part on a registration request from the UE. The registration response may identify a configuration of a sleep cycle of the UE. For example, the registration response may identify a cycle length of the sleep cycle, a length of an idle mode or a connection-suspended mode of the sleep cycle, and/or the like.

At 1020, the 5G CND (e.g., using controller/processor 290, memory 292, communication unit 294, and/or the like) may receive, from the UE, a poll message based at least in part on the sleep cycle of the UE. For example, the 5G CND may receive the poll message when the UE awakes from a deep sleep of the sleep cycle. The UE may provide the poll message to determine whether a downlink communication is to be provided to the UE.

At 1030, the 5G CND (e.g., using controller/processor 290, memory 292, communication unit 294, and/or the like) may provide a response to the poll message, wherein the response selectively indicates that the UE is to enter a sleep mode, enter an idle mode, or receive a communication. For example, the response may indicate whether a communication is available for the UE and/or whether the communication is delayed. In some aspects, the response indicates to enter the idle mode when the communication is available for the UE and provision of the communication is delayed. In some aspects, the response indicates to enter the sleep mode when no communication is available for the UE. In some aspects, the response indicates the length of the idle mode. In some aspects, the poll message and the response are transmitted over a radio resource control (RRC) connection, and the RRC connection is ended when the UE enters the sleep mode. In some aspects, the poll message and the response are transmitted over an RRC connection, and the RRC connection remains established while the UE is in the idle mode. In some aspects, the poll message may include a non-access stratum (NAS) message. In some aspects, the poll message may include a modified service request message. In some aspects, the response may include a NAS message. In some aspects, the response may include a modified service response message. In some aspects, the response may indicate that the UE is to enter the connection-suspended mode.

Turning now to method 1040 of FIG. 10B, at 1050, the 5G CND (e.g., using controller/processor 240, transmit processor 220, TX MIMO processor 230, MOD 232, antenna 234, and/or the like) may provide configuration information to configure a sleep cycle of a UE. The configuration information may be for an idle mode or a connection-suspended mode of the UE. The idle mode and the connection-suspended mode may each be a mode for the UE to enter if communication is available for the UE and provision of the communication is delayed. For example, the idle mode may be an idle mode, an I-DRX mode, and/or the like. The connection-suspended mode may be a suspended connected mode, a C-DRX mode, and/or the like.

At 1060, the 5G CND (e.g., using antenna 234, DEMOD 232, MIMO detector 236, receive processor 238, controller/processor 240, and/or the like) may receive, from the UE, a poll message based at least in part on the sleep cycle of the UE. At 1070, the 5G CND (e.g., using controller/processor 240, transmit processor 220, TX MIMO processor 230, MOD 232, antenna 234, and/or the like) may transmit a response to the poll message, the response indicating whether or not a communication is available for the UE. These operations are described in more detail in connection with blocks 1020 and 1030, above.

Although FIGS. 10A and 10B show example blocks of methods of wireless communication, in some aspects, the methods may include additional blocks, fewer blocks, different blocks, or differently arranged blocks than those shown in FIGS. 10A and 10B. Additionally, or alternatively, two or more blocks shown in FIGS. 10A and 10B may be performed in parallel.

Figure 11:
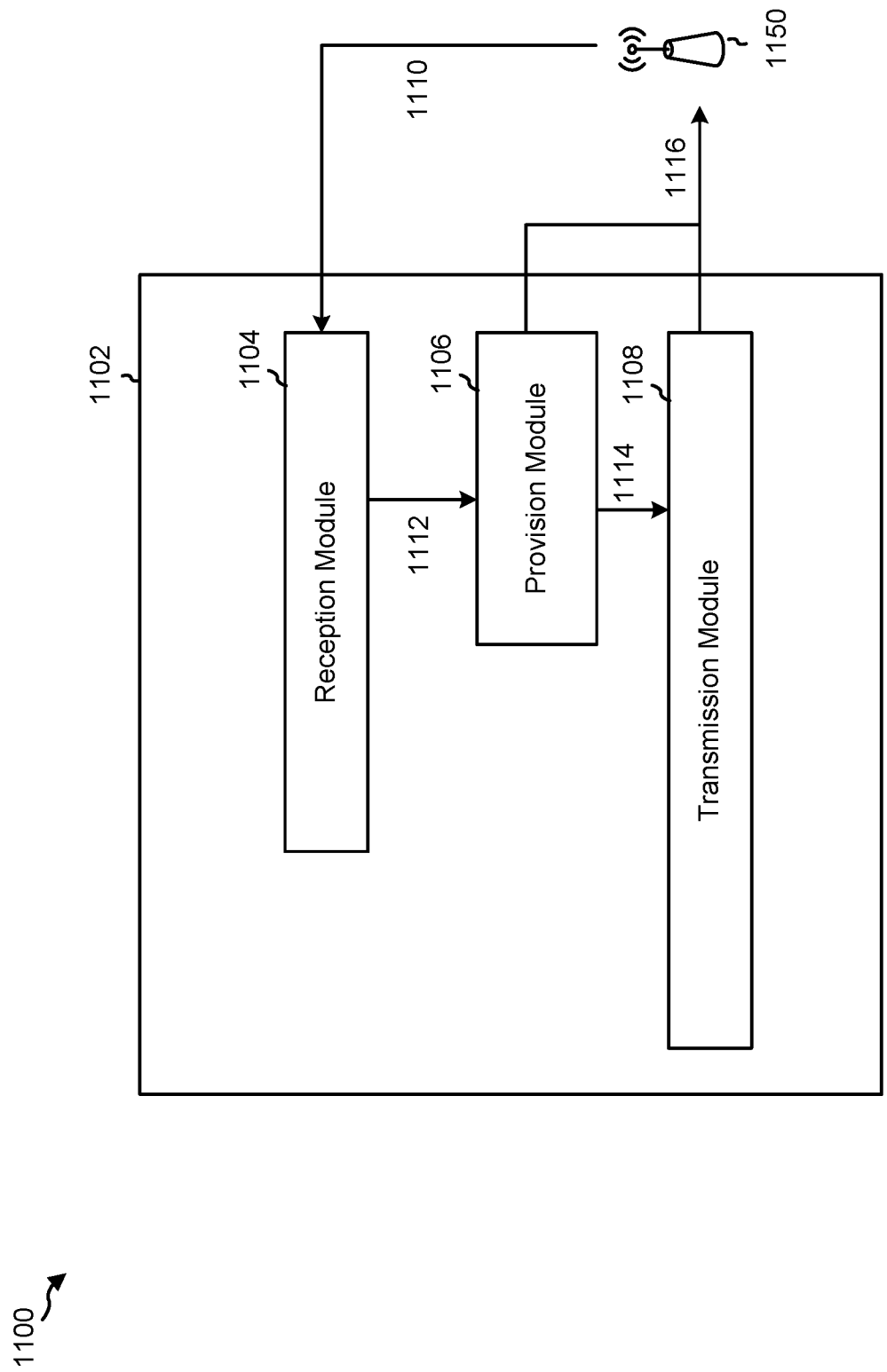
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a 5G CND. In some aspects, the apparatus 1102 includes a reception module 1104, a provision module 1106, and/or a transmission module 1108.

Reception module 1104 may receive signals 1110 from a wireless communication device 1150. In some aspects, reception module 1104 may receive the signals 1110 using antenna 252, DEMOD 254, receive processor 258, controller/processor 280, a modem of BS 110 (not shown in FIG. 2), and/or the like. In some aspects, the wireless communication device 1150 may include a BS 110 (e.g., a RAN). In some aspects, the wireless communication device 1150 may include a UE 120 (e.g., when the 5G CND is included in a BS 110). In some aspects, the signals 1110 may include a registration request, a poll request, and/or the like. Reception module may provide data 1112 to provision module 1106.

Provision module 1106 may provide data 1114 to transmission module 1108 and/or data 1116 to wireless communication device 1150. For example, the data 1114/1216 may include a registration response, a poll response, a data notification or page, and/or the like. In some aspects, provision module 1106 may use MOD 254, transmit processor 264, controller/processor 280, a modem of BS 110 (not shown in FIG. 2), and/or the like. In some aspects, when the apparatus 1102 is included in a BS 110, the transmission module 1108 may transmit data 1116. In some aspects, when the wireless communication device 1150 is a BS 110, the provision module 1106 and/or transmission module 1108 may provide the data 1116 for transmission by the wireless communication device 1150. In some aspects, the transmission module 1108 may use antenna 252, MOD 254, transmit processor 264, TX MIMO processor 266, controller/processor 280, and/or the like.

The apparatus may include additional modules that perform each of the blocks of the algorithm in the aforementioned method 1000 of FIG. 10 and/or the like. As such, each block in the aforementioned method 1000 of FIG. 10, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
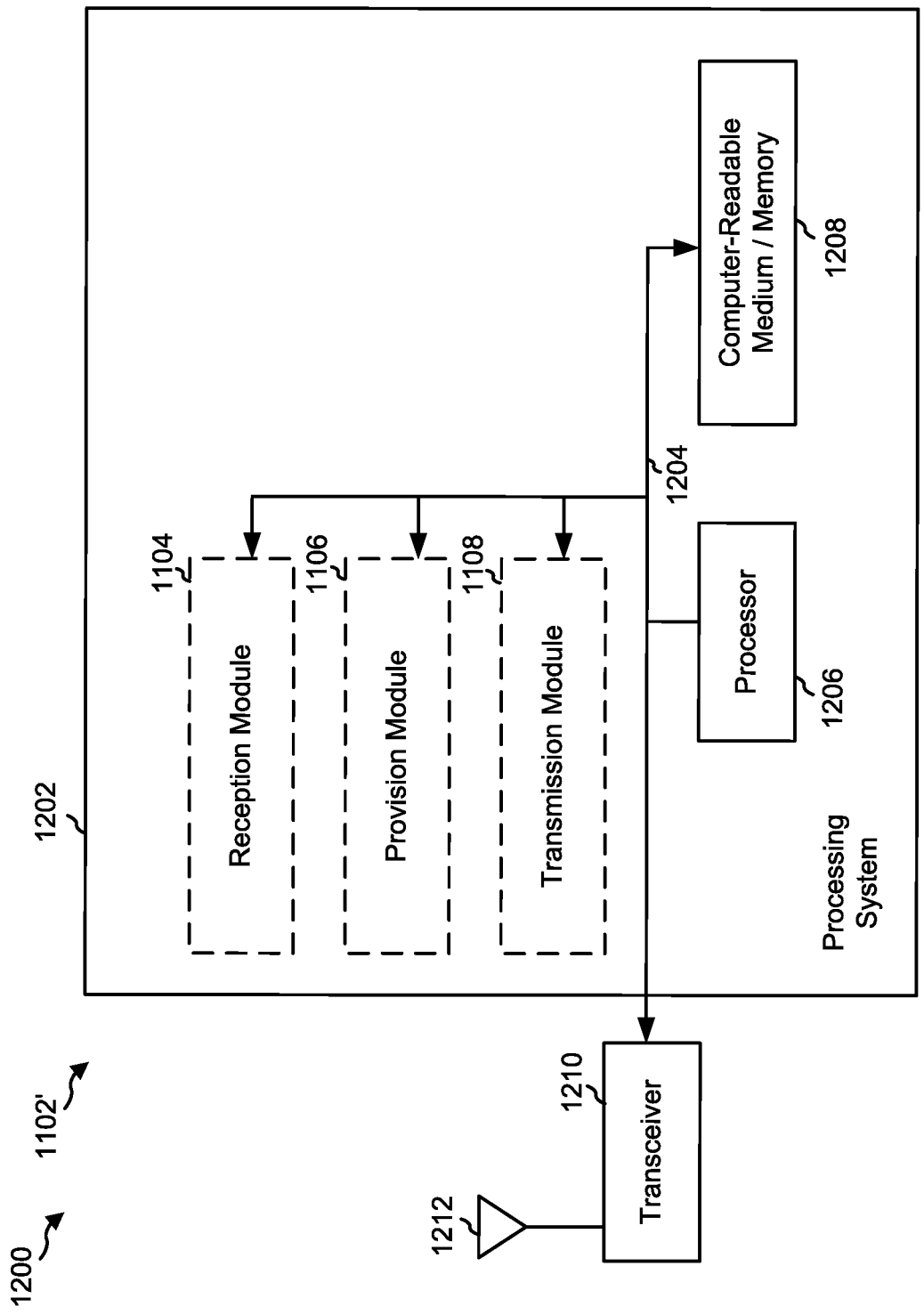
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, and 1108. The modules may be software modules running in the processor 1206, resident/stored in the computer readable medium/memory 1208, one or more hardware modules coupled to the processor 1206, or some combination thereof. The processing system 1202 may be a component of the BS 110 and may include the memory 242 and/or at least one of the TX MIMO processor 230, the receive processor 238, and/or the controller/processor 240. In some aspects, the processing system 1202 may be a component of network controller 130, and/or the like, which may be included in or associated with the BS 110.

In some aspects, the apparatus 1102/1102' for wireless communication includes means for providing configuration information to configure a sleep cycle of a UE; means for receiving, from the UE, a poll message based at least in part on the sleep cycle of the UE; means for providing a response to the poll message, wherein the response selectively indicates that the UE is to enter a sleep mode, enter an idle mode, or receive a communication; means for providing configuration information to configure a sleep cycle of a user equipment (UE), wherein the configuration information is for an idle mode or a connection-suspended mode of the UE, the idle mode and the connection-suspended mode each comprising a mode for the UE to enter if communication is available for the UE and provision of the communication is delayed; and means for transmitting a response to the poll message, the response indicating whether or not a communication is available for the UE. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   transmitting a poll message after awakening from a sleep mode;
   receiving a response to the poll message, the response indicating that a communication is available for the UE; and
   entering an idle mode or a connection-suspended mode based on the response indicating that the communication is available for the UE and provision of the communication is delayed.

2. The method of claim 1, further comprising transmitting a request to configure a sleep cycle of the UE, wherein the request indicates a length of the idle mode or the connection-suspended mode.

3. The method of claim 1, further comprising:
   while in the idle mode or the connection-suspended mode, receiving a notification that the communication is to be provided to the UE;
   receiving the communication; and
   entering the sleep mode after the communication is received.

4. The method of claim 1, wherein the idle mode or the connection-suspended mode includes one or more discontinuous reception periods.

5. The method of claim 1, further comprising returning to the sleep mode based on a different response indicating that no communication is available for the UE.

6. The method of claim 5, further comprising:
   transmitting a different poll message; and
   receiving the different response over a radio resource control (RRC) connection, wherein the RRC connection is ended when the UE returns to the sleep mode.

7. The method of claim 1, wherein transmitting the poll message and receiving the response comprise transmitting the poll message and receiving the response over a radio resource control (RRC) connection, and wherein the RRC connection remains established while the UE is in the connection-suspended mode.

8. The method of claim 1, wherein the response indicates a length of the idle mode or the connection-suspended mode.

9. The method of claim 1, wherein a length of the idle mode or the connection-suspended mode is negotiated at a registration stage.

10. The method of claim 1, wherein the poll message is a non-access stratum (NAS) message.

11. The method of claim 1, wherein the poll message is a modified service request message.

12. The method of claim 1, wherein the response is a non-access stratum (NAS) message.

13. The method of claim 1, wherein the response is a modified service response message.

14. The method of claim 1, wherein awakening and transmitting the poll message is based at least in part on an application at the UE.

15. The method of claim 1, wherein awakening and transmitting the poll message is based at least in part on the UE detecting an event.

16. A user equipment (UE) for wireless communication, comprising:
memory; and
one or more processors coupled to the memory, the memory and the one or more processors configured to:
transmit a poll message after awakening from a sleep mode;
receive a response to the poll message, the response indicating that a communication is available for the UE; and
enter an idle mode or a connection-suspended mode based on the response to the poll message indicating that the communication is available for the UE and provision of the communication is delayed.

17. The UE of claim 16, wherein the one or more processors are further configured to transmit a request to configure a sleep cycle of the UE, and wherein the request indicates a length of the idle mode or the connection-suspended mode.

18. The UE of claim 16, wherein the one or more processors are further configured to:
while in the idle mode or the connection-suspended mode, receive a notification that the communication is to be provided to the UE;
receive the communication; and
enter the sleep mode after the communication is received.

19. The UE of claim 16, wherein the one or more processors are further configured to return to the sleep mode based on a different response indicating that no communication is available for the UE.

20. The UE of claim 16, wherein the one or more processors are further configured to:
transmit a different poll message; and
receive a different response over a radio resource control (RRC) connection,
wherein the RRC connection is ended when the UE returns to the sleep mode.

21. The UE of claim 16, wherein the response is received over a radio resource control (RRC) connection, and wherein the RRC connection remains established while the UE is in the connection-suspended mode.

22. The UE of claim 16, wherein the poll message is awakened and transmitted based at least in part on an application at the UE.

23. The UE of claim 16, wherein the poll message is awakened and transmitted base at least in part on the UE detecting an event.

24. A method of wireless communication performed by a 5G core network device, comprising:
providing configuration information to configure a sleep cycle of a user equipment (UE), wherein the configuration information is for an idle mode or a connection-suspended mode of the UE, the idle mode and the connection-suspended mode each comprising a mode for the UE to enter based on the communication being available for the UE and provision of the communication being delayed;
receiving, from the UE, a poll message; and
transmitting a response to the poll message, the response indicating whether or not the communication is available for the UE.

25. The method of claim 24, wherein the response indicates to the UE to enter the idle mode or the connection-suspended mode when the communication is available for the UE and provision of the communication is delayed.

26. The method of claim 24, wherein the response indicates a length of the idle mode or the connection-suspended mode.

27. The method of claim 24, wherein the response indicates to the UE to enter a sleep mode when no communication is available for the UE.

28. The method of claim 24, wherein receiving the poll message and transmitting the response comprises receiving the poll message and transmitting the response over a radio resource control (RRC) connection, and wherein the RRC connection is ended when the UE enters a sleep mode.

29. The method of claim 24, wherein receiving the poll message and transmitting the response comprises receiving the poll message and transmitting the response over a radio resource control (RRC) connection, and wherein the RRC connection remains established while the UE is in the connection-suspended mode.

30. A device for wireless communication, comprising:
memory; and
one or more processors coupled to the memory, the memory and the one or more processors configured to:
provide configuration information to configure a sleep cycle of a user equipment (UE), wherein the configuration information is for an idle mode or a connection-suspended mode of the UE, the idle mode and the connection-suspended mode each comprising a mode for the UE to enter based on the communication being available for the UE and provision of the communication being delayed;
receive, from the UE, a poll message; and
transmit a response to the poll message, the response indicating whether or not hall the communication is available for the UE.

* * * * *